Jan. 16, 1951   W. N. FINDLEY   2,538,303
MEANS FOR DETERMINING AERODYNAMIC STATES OF AIRCRAFT
Filed March 22, 1944   2 Sheets-Sheet 1

INVENTOR.
William Nichols Findley
BY Mann, Brown & Cox

ATTORNEYS

Jan. 16, 1951        W. N. FINDLEY        2,538,303

MEANS FOR DETERMINING AERODYNAMIC STATES OF AIRCRAFT

Filed March 22, 1944        2 Sheets-Sheet 2

INVENTOR.
William Nichols Findley
BY Mann, Brown & Cox

ATTORNEYS

Patented Jan. 16, 1951

2,538,303

UNITED STATES PATENT OFFICE 2,538,303

MEANS FOR DETERMINING AERODYNAMIC STATES OF AIRCRAFT

William Nichols Findley, Urbana, Ill., assignor to Robert C. Brown, Jr., Highland Park, Ill., as trustee Application March 22, 1944, Serial No. 527,660

4 Claims. (Cl. 73—178)

My invention relates to instrumentalities for revealing aerodynamic factors in the course of aircraft flight and is particularly directed to the problem of ascertaining the instant effect of all the forces acting on the aircraft.

The large amount of work that has been done in the field of aerodynamics reveals that a number of factors, forces, effects, and various values and derivatives employed by aeronautical engineers vary concurrently with the flight behavior or what may be termed the "aerodynamic state" of an aircraft. Among these the following may be listed: the weight of the aircraft, fuel load, pay load, thrust, wing loading, accelerations, structural strain, internal stresses, attitude, dimensions of the aircraft, mass density of the air, true air speed, pressures reflecting air speed, dynamic pressure, angle of attack, lift coefficient, drag coefficient, moment coefficient, and position of center pressure. Values representing selective items from the above list are commonly combined mathematically to express relationships involved in aircraft design and flight. Such a grouping of values may, if desired, be so complete as to express or reflect the net effect of all the forces that determine the behavior of the aircraft. Since all of the items are involved in the flight behavior or aerodynamic state of the aircraft, an expression comprising a few terms selected from the list may reflect other of the listed values and such an expression may in some instances be employed primarily to determine some quantity apart from the constituent terms.

The general object of my invention is to arrive at such an expression made up of selected terms which may be employed to ascertain, indicate or reflect the aerodynamic state of the aircraft and which may, in effect, be embodied in some suitable responsive means for determining instant changes in the value of the expression in the course of aircraft flight either for following the instant variations in the aerodynamic state of the aircraft or for indicating the instant value of concurrent quantities not represented specifically by the terms of the expression.

For the purpose of the present disclosure I shall describe the invention as embodied in an aircraft instrument for continuously indicating the instant values of a function representing or related to the aerodynamic state of the aircraft. Since the invention has special utility for indicating the proximity to stall conditions, I elect to describe an instrument designed specifically to serve as a stall-warning device.

Such a warning device may serve to reduce accidents befalling fliers of limited experience, such as students in training and private fliers who take to the air only occasionally. Records of the Civil Aeronautics Administration show that the largest percentage of accidents occurring with this class of fliers are accidents resulting from stalling of aircraft under conditions precluding recovery.

A stall-warning instrument is also of service to experienced pilots especially since military and transport planes often must be flown with low margins of safety necessitating take-off and landing under conditions of high lift coefficient, the coefficient being near the stall point. A reliable instrument for indicating the proximity of the aerodynamic state of the aircraft to a stall condition will apprise the pilot of the instant availability margin of safety. Knowledge of the margin of safety is especially important in flying a plane with accumulated ice.

In general the objects of this illustrative practice of my invention are accomplished by arriving at a mathematical expression which reflects the aerodynamic state of the aircraft and which is suitable for functional representation by a combination of cooperating instrumentalities that continuously respond to changes in pertinent flight factors. In the preferred practice of the invention I employ an accelerometer in combination with an air speed indicator, or the equivalent of such a combination, to evaluate the selected expression continuously thereby to indicate the instant aerodynamic state, and I further provide a reference or index to indicate the relation of the instant aerodynamic state to stall conditions, i. e., to indicate the instant margin of safety.

The above and other objects of my invention will be apparent in the following description of my invention taken with the accompanying drawings.

In the drawings, which are to be regarded as merely illustrative,

*Derivation of a suitable mathematical expression*

An understanding of the invention may be approached advantageously by first considering a mathematical analysis leading to an appropriate basic expression.

Figure 1:
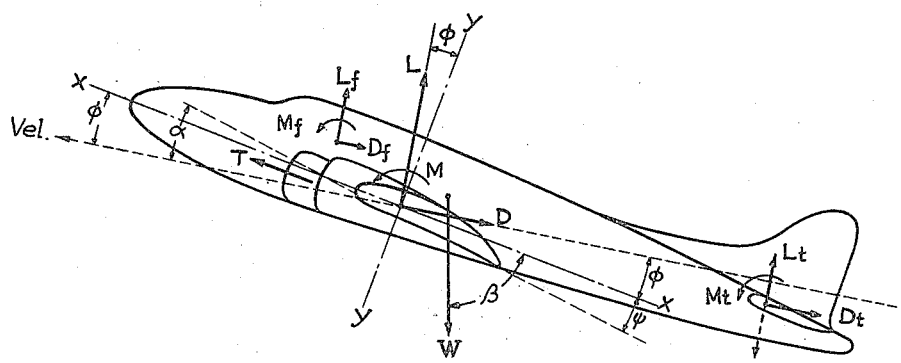
Fig. 1 is a diagram representing an aircraft in side elevation and showing relationships involved in the practice of the invention.

In Fig. 1, $x, y$ coordinates are chosen as fixed with respect to the aircraft $x$-axis is chosen parallel to axis of propeller shafts $y$-axis is perpendicular to $x$-axis and to a line drawn from tip to tip of wing.

$L$ is the lift component of aerodynamic force on wing.

$D$ is the drag component of aerodynamic force on wing.

$M$ is the moment of the aerodynamic force on wing about a particular spanwise line through the airfoil at the aerodynamic center.

$L_t, D_t, M_t$; $L_f, D_f, M_f$ are the lift drag and moment components of the aerodynamic forces acting on the tail plane and fuselage respectively.

$T$ is the propeller thrust.

$W$ is the gross weight of the aircraft.

$\alpha$ is the angle of attack, which is the angle between the chord line and the line of flight.

$\phi = \alpha - \psi$ or the angle between the $x$-axis and the line of flight.

$\psi$ is the angle between the chord line and the $x$-axis.

The components of the forces parallel to the $y$-axis are:

$$\Sigma L_y = (L + L_f + L_t) \cos \phi = L' \cos (\alpha - \psi)$$
$$\Sigma D_y = (D + D_f + D_t) \sin \phi = D' \sin (\alpha - \psi)$$
$$W_y = -W \sin \beta$$

$\beta$ is an angle defining the attitude of the plane as indicated in Figure 1.

But the aerodynamic forces can be expressed in terms of dimensionless coefficients, $C$. For example, $$L = C_L A \rho \frac{V^2}{2}$$

where $C$'s are functions of $\alpha$.

$A$ is a representative area of the wing, $\rho$ is the mass density of the air, $V$ is the true air speed. Then:

$$\Sigma L_y = C'_L \cos (\alpha - \psi) A \rho \frac{V^2}{2}$$

$$\Sigma D_y = C'_D \sin (\alpha - \psi) A \rho \frac{V^2}{2}$$

Substituting in Newton's law of motion, $$\Sigma F_y = M a_y$$

the following is obtained:

$$C'_L \cos (\alpha - \psi) A \rho \frac{V^2}{2} + C'_D \sin (\alpha - \psi) A \rho \frac{V^2}{2} - W \sin \beta = \frac{W}{g} a_y$$

Let $C'_L \cos (\alpha - \psi) + C'_D \sin \alpha - \psi = C'_{LD}$, where $C'_{LD}$ is a dimensionless coefficient derived from the component of all aerodynamic forces acting on the plane, in the $y$-direction. Then:

$$C'_{LD} A \rho \frac{V^2}{2} - W \sin \beta = \frac{W}{g} a_y$$

from which I derive the following expression on which I may base the practice of my invention:

$$C'_{LD} = \frac{W\left(\frac{a_y}{g} + \sin \beta\right)}{A \rho \frac{V^2}{2}}$$

Figure 2:
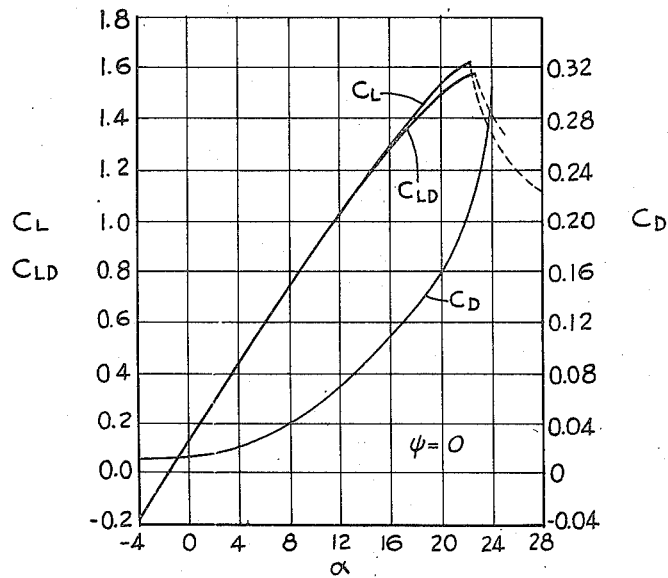
Fig. 2 is a graph showing lift and drag coefficients for different angles of attack.

The manner in which the value of $C'_{LD}$, i. e., the value of the derived basic expression, varies with the angle of attack of a particular airfoil is indicated in Fig. 2. Fig. 2 is derived from the coefficients for NACA Airfoil No. 2412 given in NACA Technical Report 460. The conditions of the test were as follows:

$R = 3.25 \times 10^6$
Span—infinite
Velocity 68 ft./sec.
Pressure 21 atmospheres
$C'_{LD} = C'_L \cos (\alpha - \psi) + C'_D \sin (\alpha - \psi)$
Let $\psi = 0$ ($\psi$ = angle between chord line and $x$-axis) (unprimed coefficients are for airfoil of $\infty$ span.)

The maximum value of $C'_{LD}$ (which corresponds to the stall condition) is a function of Reynold's number $$R = \rho \frac{V \sqrt{A}}{\mu}$$

where $\mu$ is the coefficient of viscosity of the air. The variation of $(C'_{LD})_{max}$ with change in $R$ is, however, small and depends on the airfoil used. $(C'_{LD})_{max}$ varies from 1.2 to 1.4 for many common airfoil sections when $R$ varies from 200,000 to 3,500,000. Some airfoils have a larger variation and some much smaller.

The basic expression $$C'_{LD} = \frac{W\left(\frac{a_y}{g} + \sin \beta\right)}{A \rho \frac{V^2}{2}}$$

is admirably suited for my purpose because changes in value of the numerator can be followed by various instrumentalities and changes in values of the denominator likewise can be followed by various instrumentalities. Thus the numerator varies as a function of the sum of weight force plus acceleration force, or again as a function of wing strain, or again as a function of wing stress resulting from mass considerations, i. e., gross weight of the aircraft as one mass consideration and acceleration as another mass consideration. The denominator varies with a function of the product of mass density of air and true air velocity, or again as the difference between Pitot tube pressure and static tube pressure, or again as a function of indicated air speed. It follows that various instrumentalities may be used to reflect changing values of both the numerator and the denominator in various practices of my invention and I am not limited to the particular instrumentalities that are described herein by way of example.

The denominator can be measured by means of the Pitot-static tubes of a conventional airspeed indicator since $A$ is constant for a given aircraft and $\rho \frac{V^2}{2} = p_s - p_o =$ the difference between Pitot and static pressures. (No altitude correction is required.)

The numerator, $$\frac{a_y}{g} + \sin \beta$$

can be obtained from an accelerometer as follows. Let an accelerometer, consisting of a spring supported mass, be mounted in the aircraft in such a way that the mass is free to move in the direction of the $y$-axis only, and mounted at the center of mass of the aircraft. However, for practical reasons it probably must be mounted on the instrument panel forward of the center of mass.

Figure 3:
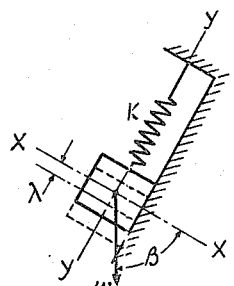
Fig. 3 is a diagram illustrating the principle of an accelerometer that may be employed in the practice of the invention.

In Fig. 3 the $y$-axis is parallel to the $y$-axis of the aircraft in Fig. 1. The $x$-axis is parallel to the $x$-axis in Fig. 1. $\lambda$ is the distance the spring is stretched from its unstressed position.

Applying Newton's law along the $y$-axis, positive upward:

$$k\lambda - w \sin \beta = \frac{w}{g} a_y$$

The accelerometer displacement, $$\lambda = \frac{w}{k}\left(\frac{a_y}{g} + \sin \beta\right)$$

where $$\frac{w}{k}$$

is a constant of the instrument which for accuracy must have such a magnitude that the natural frequency of the accelerometer is at least twice as high as the highest frequency of the accelerations to be recorded. The natural frequency of the accelerometer is given by the relation $$f_N = \frac{1}{2\pi}\sqrt{\frac{kg}{w}}$$

To relate the basic expression, $$C'_{LD} = \frac{W\left(\frac{a_y}{g} + \sin \beta\right)}{A\rho \frac{V^2}{2}}$$

to physical instrumentalities, namely an accelerometer and an air speed indicator, the numerator may be changed as follows, $W$ being treated as a constant for the present purpose:

$$\frac{a_y}{g} + \sin \beta = \frac{k}{w}\lambda = \frac{k}{w} n_3 \lambda_1$$

where $\lambda_1$ is the deflection of the end of the lever system moved by the accelerometer.

$n_3$ is a constant—the lever ratio of any multiplication system required $= \lambda/\lambda_1$ In the same manner the denominator may be changed as follows:

$$\rho \frac{V^2}{2} = p_s - p_o = n_1 \Delta = n_1 n_2 \Delta_1$$

where $\Delta$ is the deflection of the bellows of the air speed indicator.

$\Delta_1$ is the deflection of the end of the lever system moved by the bellows which responds to $p_s - p_o$.

$n_1$ is a constant depending on the stiffness of the bellows.

$n_2$ is a constant—the lever ratio $= \Delta/\Delta_1$.

Using these new expressions for the numerator and the denominator, my basic expression for $C'_{LD}$ becomes $$C'_{LD} = \frac{W}{A}\frac{k}{w}\frac{n_3}{n_1 n_2}\frac{(\lambda_1)}{\Delta_1}$$

$\lambda_1$ and $\Delta_1$ are independently variable and all other terms on the right hand side are constants with the exception of $W$. If $W$ is treated as a constant, as in practice it may be treated, at least for short periods of time when $W$ varies only with fuel consumption, it is necessary only that the required stall-warning device indicate changing values of the ratio $$\frac{\lambda_1}{\Delta_1}$$

i. e., the resultant of the effects of $\lambda_1$ and $\Delta_1$.

*The preferred form of the indicating mechanism*

Within the scope of my invention various expedients may be employed to determine and/or to indicate the changes in the instant values of this ratio. In the preferred practice of my invention I use an accelerometer, as above described, in combination with the conventional air speed indicator of the aircraft thus giving the air speed indicator a dual function.

Of the various expedients that may be employed for functionally relating an accelerometer with an air speed indicator for my purpose, I prefer an arrangement in which the angular position of a rotary indicating means is governed by the two aircraft instruments jointly determining the position of a control point for the rotary indicating means, the instant tangent of the indicating angle being $$\frac{\lambda_1}{\Delta_1}$$

Figure 4:
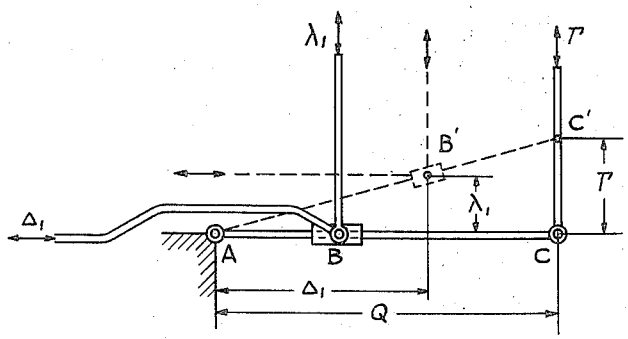
Fig. 4 is a diagram of means that may be employed for mechanically combining factors in the practice of the invention.

The principle involved in such a mode of cooperation between an accelerometer and an air speed indicator may be readily understood by reference to Fig. 4.

In Fig. 4 the lever AC of length Q is pivoted at A and carries a slider or similar construction B representing the control point for the lever AC. The horizontal displacement of B from A is governed by the differential pressure on the bellows of the air speed indicator and is equal to $\Delta_1$. The vertical displacement of B relative to A is governed by the accelerometer and is equal to $\lambda_1$. If the vertical displacement of C is given by $\Gamma$ then for small angular displacements of C relative to A $$\Gamma = Q\frac{\lambda_1}{\Delta_1}$$

Comparing this equation with the above equation for $C'_{LD}$ it is evident that $C'_{LD}$ is proportional to $\Gamma$.

It is evident from the above equation that an instrument built along such lines must have a lower limit set on values of $\Delta_1$ because as $\Delta_1$ becomes small $\Gamma$ becomes very large (if $\lambda_1$ is not zero). If $\lambda_1$ is zero then as $\Delta_1$ approaches zero $\Gamma$ becomes indeterminate and may take any value.

An instrument built along the above lines would have a linear scale of lift coefficient if the displacements of the lever system involved are linear.

In order to prevent damage to an instrument such as described below, the maximum value of $\lambda_1$ must be fixed so that the maximum $\lambda_1$ when $\Delta_1$ is minimum will not cause $\Gamma$ to be larger than permissible.

Figure 5:
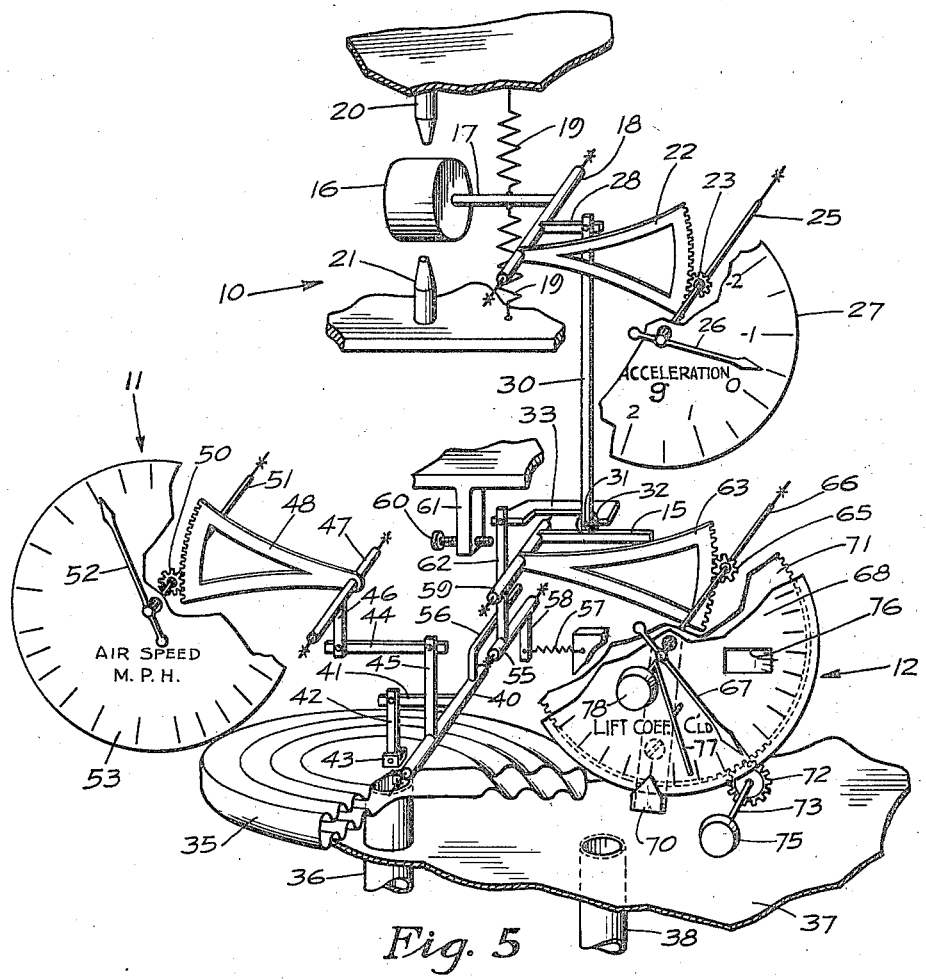
Fig. 5 is a simplified diagrammatic view in perspective showing one form of mechanism that may be employed for the practice of my invention.

A mechanism for embodying the principle illustrated by Fig. 4 may be constructed in the manner indicated by Fig. 5. Fig. 5 is diagrammatic and for simplification omits various mechanical details such as counterbalancing means and hair springs which need not be recited or explained to those skilled in the art.

The essential parts of the mechanism shown in Fig. 5 are an accelerometer generally designated 10, an air speed indicator generally designated 11, and a stall-warning indicator generally designated 12. The stall-warning indicator 12 includes a rotary means in the form of an arm 15 adapted to respond to both the accelerometer and the air speed indicator, the arm 15 corresponding to the arm AC of Fig. 4.

The specific accelerometer 10 selected by way of example includes a weight 16 carried by an arm 17 extending radially from a shaft 18, the weight being movable about the axis of the shaft in an arcuate path between an upper stop 20 and a lower stop 21 to indicate the magnitude of acceleration. Under conditions of no acceleration, the weight is maintained in its neutral position by virtue of a pair of opposed springs 19. The shaft 18 carries a gear segment 22 in mesh with a pinion 23 on a handstaff 25. The handstaff carries a pointer 26 that traverses a suitably graduated dial 27.

For providing a component of motion and transmitting the component to the arm 15, the shaft 18 is shown with a radial arm 28 from which a link 30 extends downward to a spindle 31, the spindle carrying a small roller 32 in operating contact with the arm 15. It is apparent that the small roller 32 corresponds functionally to the slider B of Fig. 4. The spindle 31 is mounted on a link 33 that is operatively connected to the air speed indicator 11 in a manner that will be explained.

The air speed indicator 11 may be of the conventional type including a bellows 35 from which a tube 36 extends in the usual manner to the pressure Pitot line of a Pitot tube (not shown). To permit proper functioning of the bellows 35, the entire mechanism is enclosed in an airtight casing 37 vented through a tube 38 to the static line of the Pitot static tube.

A suitable shaft 40 is operatively connected to the bellows 35 by means of a radial arm 41 and a link 42 to a small bracket 43 on the bellows. For indicating air speed, the shaft 40 has a radial arm 45 connected by a link 44 to a radial arm 46 of a shaft 47. The shaft 47 carries a gear segment 48 in mesh with a pinion 50 on a handstaff 51, the handstaff carrying the usual pointer 52 in front of an air speed dial 53.

In addition to actuating the pointer 52, the shaft 40 actuates the link 33 carrying the roller 31. To this end the shaft 40 is adapted to operate a shaft 55 coaxial therewith by means of an angular arm 56, the arm being arranged to cause clockwise rotation of the shaft 55 but not counterclockwise. A spring 57 acting on an arm 58 causes the shaft 55 to remain in synchronism with the shaft 40 within a range limited by a stop screw 60 carried by a fixed means 61. The stop screw 60 is in the path of an arm 62 that extends radially from the shaft 55 and is pivotally connected to the previously mentioned link 33.

It is apparent that the roller 32 serves as a control point for determining the angular position of the arm 15, and that the vertical distance of this control point from the axis of rotation of the arm 15 is governed by the accelerometer 10 and the horizontal distance is governed by the air speed indicator 11. The angular position of the arm will therefore vary with the instant value of the ratio $$\frac{\lambda_1}{\Delta_1}$$

The arm 15 may itself be employed as the indicator for proximity to stall conditions but I prefer the arrangement shown in which the shaft 59 carrying the arm 15 also carries a gear segment 63 in mesh with a pinion 65 on a handstaff 66, the handstaff carrying a suitable pointer 67. The pointer indicates values on a fixed dial face 68.

The relative proximity of the aerodynamic state of the aircraft to stalling condition may be indicated by the position or angle of the pointer 67 relative to a suitable reference or stalling index. In my preferred arrangement I make such an index or reference adjustable relative to the dial to compensate for variations in the gross weight of the aircraft. Thus, in Fig. 5 I employ a reference or index member 70 in the form of a bent pointer mounted on a gear 71 mounted concentrically behind the fixed dial face 68. The gear 71 is in mesh with a pinion 72 on a shaft 73 that may be manually controlled by a suitable knob 75 on the instrument panel. For guidance in such compensating adjustment for changes in the gross weight, the face of the gear 71 may be graduated in terms of gross weight, the numerals of which may be registered with and viewed through a small window 76 in the dial face 68.

Mode of operation

The manner in which the preferred form of the invention operates will be readily understood from the foregoing description. It is merely necessary for the pilot to observe from time to time the position of the pointer 67 relative to the reference member 70 to be informed of the margin of safety relative to stall conditions. Since the accelerometer and the air speed indicator operate with substantially no lag in response to changes in the magnitude of acceleration and air speed, the position of the pointer 67 represents substantially the instant value of the lift coefficient $C'_{LD}$.

At the beginning of a flight the knob 75 is manipulated to position the reference member 70 in accord with the gross weight of the aircraft at take-off. During flight the pilot will manipulate the knob 75 from time to time to compensate for consumption of fuel and oil by the aircraft engines. Such compensation may be made continuously by suitable automatic means. If the net load drops suddenly in the course of flight, as when a load of bombs is released, the pilot will shift the reference member 70 accordingly.

In this preferred form of the invention the stall indication pointer 67 is associated with a dial 68 having linear graduations. The scale of graduations may be purely arbitrary or, if desired, the scale may be so chosen as to indicate actual values of lift coefficient, $C'_{LD}$ for a given magnitude of gross weight.

While the described arrangement provides for a simple visual indication for guidance of the pilot, it will be readily understood by those skilled in the art that various signal expedients may be employed.

An important feature of the invention is that it offers the pilot means to ascertain the exact aerodynamic effect of icing and thereby to ascertain the margin of safety available in maneuvering the aircraft to a landing. When the wings become iced, the pilot may stall his plane at a safe altitude in such manner as to ascertain the stall position of the pointer 67. Having ascertained the stall point under ice conditions, the pilot may either keep the stall point in mind or may manipulate the knob 75 to the new stall point for guidance in landing the airplane, making suitable allowance for continued ice formation. If a maximum-indicating pointer 77 with a reset knob 78 is added, as shown in Fig. 5, the added pointer will be automatically moved to the danger point by the trial stall of the iced aircraft thus simplifying the pilot's task of ascertaining the narrowed margin of safety.

While the described form of the invention is in effect a triple instrument with three dials for indicating acceleration, air speed, and lift coefficient, respectively, either or both of the dials for acceleration or air speed may be omitted leaving a single dial for lift coefficient.

Since the pointer 67 indicates variations in the value of the life coefficient $C'_{LD}$, the pointer may be employed to indicate the instant value of any factor or effect that varies with the value of $C'_{LD}$. For example, the dial 68 may be provided with a scale to indicate angles of attack. Obviously the mechanism may also be modified to indicate the instant value of factors or effects that vary inversely as the lift co-efficient $C'_{LD}$.

While the particular practice of the invention set forth in detail is directed primarily to ascertain the aerodynamic states accompanying variation in pitch or the angular position of the aircraft about a transverse axis, it will be readily understood that the same principles may be based on or related to the attitude of the aircraft with respect to other axes, such as the $x$ and $y$-axes mentioned above.

The preferred form of my invention described in specific detail herein will suggest to those skilled in the art various changes and substitutions under my basic concept and I reserve the right to all such departures from the described form of the invention that properly lie within the scope of my appended claims.

I claim:

1. A device of the character described to indicate the instant effect of aerodynamic forces on an aircraft relative to the effect of the aerodynamic forces on the aircraft under given conditions comprising a first means responsive to acceleration forces affecting the stressing of the wings of the aircraft, a second means responsive to changes in dynamic pressure on the aircraft, indicating apparatus including an indicator operatively connected to said first means and said second means, said apparatus being responsive solely to changes in the ratio between the response of said first means and the response of said second means, and reference means to indicate the position of said indicator at which said ratio corresponds to said given conditions, said reference means being adjustable relative to said indicator to compensate for variations in the gross weight of the aircraft.

2. In means of the character described to determine the instant aerodynamic state of an aircraft, the combination of means rotatable about a fixed axis through an angular range of positions representing a progressive series of aerodynamic states, a control means operatively connected with said rotary means to determine the angular position thereof, said control means being movable in two dimensions for regulation of the rotary means, means to move said control means with respect to one of said dimensions in response to changes in acceleration force affecting the stressing of the aircraft wings, and means to move said control means with respect to the other said dimensions in response to changes in the dynamic pressure on the aircraft.

3. In an aircraft instrument having an air speed indicator and an accelerometer indicator, the combination therewith of a stall warning apparatus operatively connected to said two indicators, said connection comprising a pointer shaft, means for rotating said shaft, an instrumentality for operating said means, a first transmission means for feeding into said instrumentality responses from said air speed indicator, a second transmission means for feeding into said instrumentality responses from said accelerometer indicator, said instrumentality including means responsive to changes in the ratio between responses from said two transmission means for actuating said shaft rotating means both vectorally and quantitatively in relation to changes in such ratios.

4. In an aircraft instrument having an air speed indicator and an accelerometer indicator, the combination therewith of a stall warning apparatus operatively connected to said two indicators, said connection comprising a pointer shaft, means for rotating said shaft, an instrumentality for operating said means, a first transmission means for feeding into said instrumentality responses from said air speed indicator, a second transmission means for feeding into said instrumentality responses from said accelerometer indicator, said instrumentality including means responsive to changes in the ratio between responses from said two transmission means for actuating said shaft rotating means both vectorally and quantitatively in relation to changes in such ratios, and reference means adjustably positionable relative to said pointer shaft for indicating stall conditions in relation to changes in the gross load of the aircraft.

WILLIAM NICHOLS FINDLEY.

REFERENCES CITED

The following references are of record in the file of this patent:

UNITED STATES PATENTS

| Number | Name | Date |
| --- | --- | --- |
| 1,018,582 | Nelson | Feb. 27, 1912 |
| 1,291,254 | Thaw | Jan. 14, 1919 |
| 1,885,578 | Boykow | Nov. 1, 1932 |
| 2,139,694 | Reid et al. | Dec. 13, 1938 |
| 2,182,706 | Shanley | Dec. 5, 1939 |
| 2,237,306 | Hood | Apr. 8, 1941 |
| 2,277,625 | Baynes | Mar. 24, 1942 |
| 2,352,955 | Johnson | July 4, 1944 |